(12) United States Patent
Chandrashekar (10) Patent No.: US 12,470,989 B2
(45) Date of Patent: Nov. 11, 2025

(54) METHOD, APPARATUS, AND COMPUTER-READABLE STORAGE MEDIUM FOR OPTIMIZING CONFIGURATION OF INTER-FREQUENCY LAYER MEASUREMENTS FOR LOWER LAYER MOBILITY

(71) Applicant: Rakuten Symphony, Inc., Tokyo (JP)

(72) Inventor: Subramanya Chandrashekar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,703

(22) PCT Filed: Dec. 7, 2022

(86) PCT No.: PCT/US2022/052098
§ 371 (c)(1),
(2) Date: Dec. 23, 2022

(87) PCT Pub. No.: WO2024/123324
PCT Pub. Date: Jun. 13, 2024

(65) Prior Publication Data
US 2024/0244494 A1    Jul. 18, 2024

(51) Int. Cl.
*H04W 36/04* (2009.01)
*H04W 36/00* (2009.01)

(52) U.S. Cl.
CPC ....... *H04W 36/04* (2013.01); *H04W 36/0016* (2013.01); *H04W 36/0058* (2018.08); *H04W 36/0061* (2013.01)

(58) Field of Classification Search
CPC ............ H04W 36/04; H04W 36/0058; H04W 36/0016; H04W 36/0061
See application file for complete search history.

(56) References Cited

U.S. PATENT DOCUMENTS

| | | |
|---|---|---|
| 2016/0330641 A1* | 11/2016 | Zhang ............... H04W 24/02 |
| 2017/0142632 A1* | 5/2017 | Panchal ........... H04W 36/0058 |
| 2021/0045031 A1* | 2/2021 | Lee .................. H04W 28/0284 |

OTHER PUBLICATIONS

International Search Report issued Mar. 27, 2023 in International Application No. PCT/US 22/52098.
(Continued)

*Primary Examiner* — James P Duffy
(74) *Attorney, Agent, or Firm* — Sughrue Mion, PLLC (57) ABSTRACT

A method for optimizing configuration of inter-frequency measurements for LTM of UE may be performed, at least in part by a serving gNB DU, and may include receiving intra-frequency information and inter-frequency information for one or more cells associated with one or more neighboring gNB DUs; determining whether at least one intra-frequency target cell, above a pre-defined threshold is available for LTM; based on determining that the at least intra-frequency target cell for LTM is unavailable, transmitting a first signal to a gNB centralized unit control plane (CU CP), wherein the first signal indicates to the gNB CU CP to configure a user equipment (UE) with inter-frequency L3 measurements associated with one or more inter-frequency target cells; and receiving, by the serving gNB DU, an inter-frequency L1 measurement report from the UE based on an inter-frequency cell belonging to a second gNB DU being prepared as a target cell among the one or more inter-frequency target cells for LTM.

20 Claims, 6 Drawing Sheets

(56) References Cited

OTHER PUBLICATIONS

Written Opinion issued Mar. 27, 2023 in International Application No. PCT/US 22/52098.

* cited by examiner

METHOD, APPARATUS, AND COMPUTER-READABLE STORAGE MEDIUM FOR OPTIMIZING CONFIGURATION OF INTER-FREQUENCY LAYER MEASUREMENTS FOR LOWER LAYER MOBILITY

CROSS REFERENCE TO RELATED APPLICATIONS

This application is a National Stage of International Application No. PCT/US2022/052098 filed Dec. 7, 2022.

FIELD

The present disclosure relates to inter-frequency and intra-frequency mobility of user devices in a telecommunication network and/or wireless network. In particular, the present disclosure relates to a method, apparatus, and system for optimizing configuration of inter-frequency measurements for lower layer mobility (L1/L2) of user equipment in a telecommunication network.

BACKGROUND

In a telecommunication network, e.g., 5G network, inter-frequency and intra-frequency mobility events (e.g., handover) associated with L3 may be prepared for and executed by a gNodeB centralized unit control plane (gNB CU CP). However, the methods and processes of related art are unsuitable in the context of lower layer triggered mobility events (e.g., L1/L2 centric mobility) because the gNodeB distributed unit (gNB DU) hosts the lower layer protocols of the 5G protocol stack. Thus, using the gNB CU CP to do both, preparing and executing, the mobility events associated with lower layers such as L1/L2 increases latency, reduces efficiency, reduces accuracy, and may be a non-optimal use of network resources.

Therefore, methods and systems that optimize preparation and execution of mobility events related to lower layers are needed, especially methods and processes that shift some part of the processing from the gNB CU CP to the gNB DU are needed.

SUMMARY

According to embodiments, a method for optimizing configuration of inter-frequency measurements for L1/L2 centric inter-frequency mobility management (LLM) or L1/L2 triggered mobility management (LTM) of user equipment (UE), the method being executed by at least one processor, the method including receiving, by a serving gNodeB distributed unit (serving gNB DU), intra-frequency information and inter-frequency information for one or more cells associated with one or more neighboring gNB DUs, wherein the one or more neighboring gNB DUs include DUs expected to interwork with the serving gNB DU for LTM; determining, by the serving gNB DU, whether at least one intra-frequency target cell, above a pre-defined threshold is available for LTM; based on determining that the at least one intra-frequency target cell for LTM is unavailable, transmitting, by the serving gNB DU, a first signal to a gNB centralized unit control plane (CU CP), wherein the first signal indicates to the gNB CU CP to configure a user equipment (UE) with inter-frequency L3 measurements associated with one or more inter-frequency target cells; and receiving, by the serving gNB DU, an inter-frequency L1 measurement report from the UE based on an inter-frequency cell belonging to a second gNB DU being prepared as a target cell among the one or more inter-frequency target cells for LTM.

According to embodiments, an apparatus for optimizing configuration of inter-frequency measurements for L1/L2 centric inter-frequency mobility management (LTM) of user equipment (UE) may be provided. The apparatus may include at least one memory configured to store program code; and at least one processor configured to access the program code and operate as instructed by the program code. The program code may include first receiving code configured to cause the at least one processor of a first serving gNB DU to receive intra-frequency information and inter-frequency information for one or more cells associated with one or more neighboring gNB DUs, wherein the one or more neighboring gNB DUs include DUs expected to interwork with the serving gNB DU for LTM; first determining code configured to cause the at least one processor of the first serving gNB DU to determine whether at least one intra-frequency target cell, above a pre-defined threshold is available for LTM; based on determining that the at least one intra-frequency target cell for LTM is unavailable, transmitting code configured to cause the at least one processor of the first serving gNB DU to transmit a first signal to a gNB centralized unit control plane (CU CP), wherein the first signal indicates to the gNB CU CP to configure a user equipment (UE) with inter-frequency L3 measurements associated with one or more inter-frequency target cells; and second receiving code configured to cause the at least one processor of the first serving gNB DU to receive an inter-frequency L1 measurement report from the UE based on an inter-frequency cell belonging to a second gNB DU being prepared as a target cell among the one or more inter-frequency target cells for LTM.

According to embodiments, a non-transitory computer readable medium storing instructions may be provided. The instructions may include one or more instructions that, when executed by one or more processors of a plurality of gNodeB distributed unit (serving gNB DU) for optimizing configuration of inter-frequency measurements for L1/L2 centric inter-frequency mobility management (LTM) of user equipment (UE), cause the one or more processors to receive, at a first serving gNB DU, intra-frequency information and inter-frequency information for one or more cells associated with one or more neighboring gNB DUs, wherein the one or more neighboring gNB DUs include DUs expected to interwork with the first serving gNB DU for LTM; determine, by the first serving gNB DU, whether at least one intra-frequency target cell, above a pre-defined threshold is available for LTM; based on determining that the at least one intra-frequency target cell for LTM is unavailable, transmit, by the first serving gNB DU, a first signal to a gNB centralized unit control plane (CU CP), wherein the first signal indicates to the gNB CU CP to configure a user equipment (UE) with inter-frequency L3 measurements associated with one or more inter-frequency target cells; and receive, by the first serving gNB DU, an inter-frequency L1 measurement report from the UE based on an inter-frequency cell belonging to a second gNB DU being prepared as a target cell among the one or more inter-frequency target cells for LTM.

BRIEF DESCRIPTION OF THE DRAWINGS

Features, advantages, and significance of exemplary embodiments of the disclosure will be described below with reference to the accompanying drawings, in which like signs denote like elements.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

Embodiments of the present disclosure relate to methods and systems for L1/L2 based inter-cell mobility to reduce mobility latency reduction. It may be understood that L1/L2 based cell mobility may be referred to as "lower layer mobility (LTM)" herein.

Figure 1:
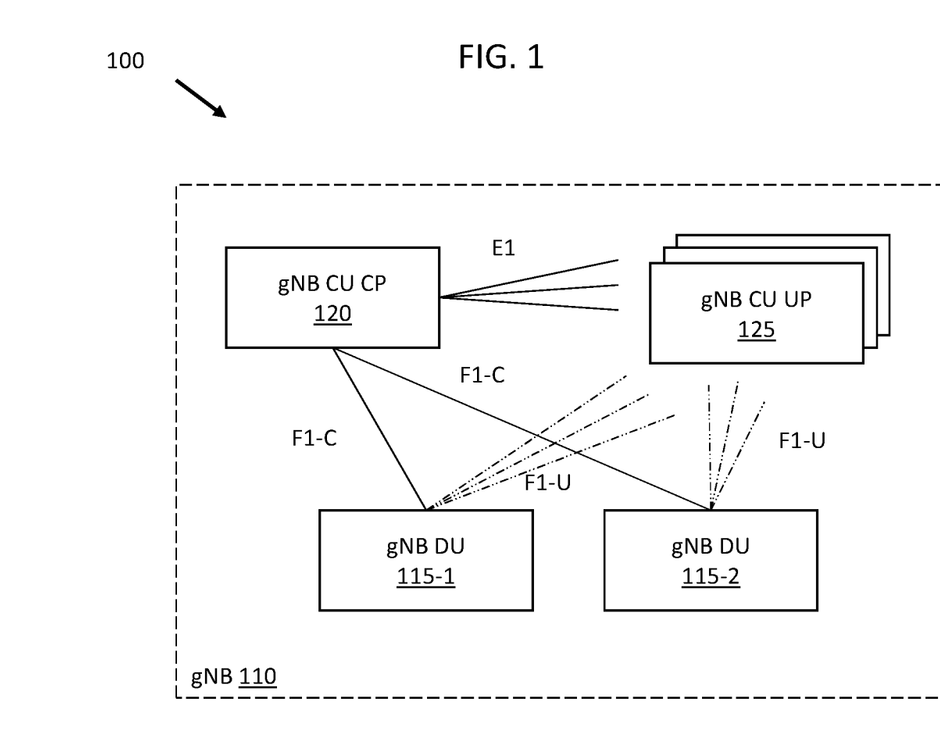
FIG. 1 is an example diagrammatic illustration of a network disaggregated architecture in which the systems and/or methods described in the present disclosure may be implemented.

Embodiments of the present disclosure relate to methods and systems to determine optimal time to configure inter-frequency L3 and L1 measurements while lower level mobility management is enabled for a UE. In related art, to support L1/L2 centric inter-cell change (e.g., change of serving cell) in the disaggregated gNB architecture 100, the gNB CU CP receives all the cell measurements and handles all mobility events, and so gNB CU CP is easily able to determine when to configure inter-frequency L3 measurements. However, all intra-gNB lower level mobility events, including inter DU and intra DU events, are executed using L1 measurements at the gNB DU. Thus, gNB DU and not gNB CU CP has more information and is able to more accurately and efficiently determine an optimal time to configure UE with inter-frequency L3 and L1 measurements. Accordingly, to improve processing efficiency, reduce latency, and increase accuracy, embodiments of the present disclosure provide methods, apparatus, and systems to determine an optimal time to configure inter-frequency L3 and L1 measurements for lower level mobility when lower level mobility is enabled for UE. An embodiment of the disclosure provides that this determination of optimal time is performed at a gNB DU (e.g., serving gNB DU) to improve efficiency, increase accuracy, and reduce overhead, latency.

As stated above, mobility events in 5G network may be prepared for and executed by a gNB CU CP (e.g., serving gNB CU CP). However, having the gNB CU CP prepare for and perform LTM events is not an optimal method. Embodiments of the present disclosure relate to LTM (e.g., L1/L2 centric inter-cell change) with a fundamental change that includes configuration of and preparation for the LTM event being performed by a gNB CU CP with the determination of an accurate and optimal time to execute serving cell change being performed by a gNB DU without interaction from the upper layers of the 5G protocol stack.

According to an embodiment, configuration of and preparation for the LTM event may include preparation of the target cell configuration, including communication with the target node or target cell (e.g., target gNB DU), and communication of the target cell or target node configuration to the UE in preparation of a handover, all performed by the gNB CU CP. However, unlike related art, the execution of the LTM event, including determining when to transmit and transmitting the handover command, may be performed by the gNB DU. For the gNB DU to execute the handover and/or transmit the handover commands, the gNB DU requires appropriate L1 measurements because the gNB DU hosts the lower layers of the 5G protocol while the gNB CU CP hosts the higher layers (e.g., L3). The L1 measurements are sent and received using the PHY layer/MAC layer (L1/L2) and the L3 measurements are sent and received using the RRC protocol.

There may be two aspects or parts when performing inter-frequency LTM. Firstly, the gNB CU CP may configure UE with inter-frequency L3 measurements to the gNB CU CP and prepare the target DUs. Then, the gNB may configure the UE to report inter-frequency L1 measurements to the gNB DU for execution of the inter-frequency LTM. In L3 mobility and/or handover events, the gNB CU CP may receive all the cell measurements and may execute the handover. Thus, in L3 mobility events, the gNB CU CP easily determines when to configure inter-frequency L3 measurements, as it is aware whether or not an intra-frequency target cell is available. However, with LTM, all the intra-gNB mobility events (including intra-DU and inter-DU mobility events or handovers) may be executed using L1 measurements at the gNB DU, so the gNB DU may execute the LTM mobility events and hence the gNB CU CP may not be aware of the ideal time to configure UE with inter-frequency L3 and L1 measurements. Configuring seamless L1/L2 triggered mobility (LTM) is one of the objectives of the feature and hence inter-frequency target cells should be configured without any delay, whenever intra-frequency target cells are unavailable.

According to an aspect of the present disclosure, a gNB DU may be configured with the intra and inter-frequency information for all the cells of neighbor DUs during F1 interface setup. This may include all the neighbor gNB-DUs with which a given DU is expected to interwork for LTM. In an embodiment, based on radio conditions, e.g., the intra-frequency L1 measurement reports received at the serving DU, the cell location of the UE in the serving gNB-DU, etc., the serving DU may determine if there are sufficient intra-frequency cells (in same DU or neighbor DU) that can be potential target cells for LTM. This threshold may be pre-determined or may be determined dynamically based on the network conditions and requirements.

In another or same embodiment, the serving DU may also use LTM load of the cells to dynamically determine availability of intra-frequency target cells for LTM in same or neighboring DUs. The LTM load information (resources available or resources consumed) between DUs may be periodically reported from all Dus to the CU CP and from the CU CP to the relevant neighboring DUs. The LTM load information may include a percentage availability or non-availability of intra-frequency and inter-frequency target cells in neighbor DUs. In some embodiments, if there is no availability of intra-frequency cells, inter-frequency measurements may have to be started. When the serving DU determines that there are no feasible intra-frequency targets, it notifies the gNB-CU-CP over F1 interface to configure inter-frequency L3 measurements and prepare corresponding target cells. Once the inter-frequency target cells are prepared, the inter-frequency L1 measurements could be configured for those prepared cells while sending the RRC Reconfiguration message to the UE. In some embodiments, when the LTM load in intra-frequency cells may be determined to be high or the cells unavailable, the serving DU may indicate to the CU-CP to configure the UE with inter-frequency measurements to configure inter-frequency measurements for cells of the its own as well.

According to embodiments, using radio conditions (e.g., intra-frequency L1 measurement reports received at the serving DU, the cell location of the UE in the serving gNB-DU, etc., at the serving gNB DU to determine the optimal time to configure inter-frequency measurements increases efficiency and reduces overhead, latency in the mobility process. Furthermore, using dynamic load availability of LTM target cells to determine the optimal time to configure inter-frequency measurements reduces the user data transmission interruption for the UE in the network and also provides an efficient way of using the network's computing resources.

According to embodiments of the present disclosure, by optimizing the time to configure inter-frequency measurements, the UE is not configured with inter-frequency measurements earlier than required and therefore the associated overhead is avoided. Since the inter-frequency measurements are configured only when needed, the UE's user-data interruption is kept to a minimum.

According to an aspect of the present disclosure, multiple candidate cells may be configured and provided to the UE in advance to allow fast application of configuration for candidate cells or a target cell to the UE. The UE may keep periodically providing L1/L2 measurements to a gNB DU (e.g., UE's serving gNB DU) for all or some of the multiple candidate cells. The gNB DU may provide a target cell to the UE from among the already configured candidate cells, making the process more efficient and reducing latency in part by excluding higher layers in the 5G protocol stack. In some embodiments, a UE may be configured for up to 8 candidate cells to perform LTM including a dynamic switch mechanism among the candidate cells. This dynamic switch may include specific or custom messages and signaling.

According to an aspect of the present disclosure, the LTM process as disclosed herein may be used when the source and target cells may be synchronized or unsynchronized. The LTM process may be used for serving cell change in the context of standalone, carrier aggregation, and dual connectivity modes. The LTM process may be used for intra-DU and intra-CU inter-DU cell changes. In some embodiments, the process may be used for both inter-frequency and intra-frequency transfers and in both FR1 and FR2. In some embodiments, the process may be limited to cell transfers and/or handovers with a single gNB.

According to an embodiment, in 6G, there could be an inter-DU (DU-DU) interface introduced and, in such scenario, there could be alternative ways of providing LTM load information reports of neighboring DUs to a given DU— e.g., directly over the DU-DU interface instead of CU-CP consolidating them and distributing to each DU (as proposed for 5G where there is no DU-DU interface).

Additionally, in contrast to 5G, in 6G the LTM load status reports received at CU-CP may be used directly (without forwarding to DU) to determine non-availability of intra-frequency target cells (e.g., to configure inter-frequency target cells and measurements). In such situations, intra-frequency L3 measurements may have to be configured as in a deployment without LTM. However, this entails an increased periodicity of LTM load information report from DUs to the CU-CP, as the decision has to be made as close to the real time load availability.

According to an aspect of the present disclosure, the gNB CU CP may transmit resource status requests to the serving gNB DU and other DUs associated with the gNB. In response to the resource status requests, the gNB CU CP may receive status responses from the respective gNB DUs. As an example, the received status responses may include LTM load status reports. In some embodiments, the gNB CU CP may transmit the received LTM load status reports to each DU associated with the gNB. In some embodiments, the gNB CU CP may transmit the received LTM load status reports to the serving gNB DU or the target gNB DU. In some embodiments, the resource status requests may be sent periodically. In some embodiments, the resource status responses may be sent periodically. It may be understood that embodiments of the present disclosure disclose methods and systems for L1/L2 based inter-cell mobility to reduce mobility latency reduction using gNodeB architecture merely as an example. It may be understood that L1/L2 based cell mobility may as disclosed herein may be performed on any Next-Generation Radio Access Network (NG-RAN) node, including gNodeB or eNodeB.

FIG. 1 is an exemplary illustration of a disaggregated gNB architecture 100 in which the systems and/or methods described in the present disclosure may be implemented.

As shown in FIG. 1, the disaggregated gNB architecture 100 may include one or more logical components or entities.

A gNB in a 5G or 6G architecture may be divided into two physical entities—a centralized unit (CU) and a distributed unit (DU). The gNB CU provides support for higher levels of 5G protocols, including but not limited to, service data adaptation protocol (SDAP), packet data convergence protocol (PDCP), radio resource control (RRC) along with L3 radio resource management (RRM) algorithms. The gNB DU provides support for lower levels of 5G protocols, including but not limited to, radio link control (RLC), medium access control (MAC) and physical layer (PHY). In some embodiments, each gNB DU is associated with only one gNB CU, but each gNB CU may be associated with multiple gNB DUs. The scheduling operations associated with handover take place in the gNB DU.

In an embodiment, the disaggregated gNB architecture 100 may include a gNB 110 that may have one or more gNB DU (115-1 and 115-2), at least one gNB CU CP 120 (gNB centralized unit control plane), and more than one gNB CU UP 125 (gNB centralized unit user plane). The gNB DU 115-1 or gNB DU 115-2 may communicate with the gNB CU CP 120 using the F1 interface (e.g., F1-C interface/protocol). The gNB DU 115-1 or gNB DU 115-2 may communicate with the gNB CU UP 125 using the F1 interface (e.g., F1-U interface/protocol). In some embodiments, the gNB CU CP 120 may communicate with the more than one gNB CU UP 125 using the E1 interface/protocol. In some embodiments, a single gNB DU (e.g., gNB DU 115-1) may host multiple cells, e.g., 512 cells. A cell may include an area covered and/or serviced by base station transmitter having a plurality of RF channels.

In related art, to support L1/L2 centric inter-cell change (e.g., change of serving cell) in the disaggregated gNB architecture 100, the gNB CU CP receives all the cell measurements and handles all mobility events, and so gNB CU CP is easily able to determine when to configure inter-frequency L3 measurements. However, all intra-gNB lower level mobility events, including inter DU and intra DU events, are executed using L1 measurements at the gNB DU. Thus, gNB DU and not gNB CU CP has more information and is able to more accurately and efficiently determine an optimal time to configure UE with inter-frequency L3 and L1 measurements. Accordingly, to improve processing efficiency, reduce latency, and increase accuracy, embodiments of the present disclosure provide methods, apparatus, and systems to determine an optimal time to configure inter-frequency L3 and L1 measurements for lower level mobility when lower level mobility is enabled for UE. An embodiment of the disclosure provides that this determination of optimal time is performed at a gNB DU (e.g., serving gNB DU) to improve efficiency, increase accuracy, and reduce latency.

Figure 2:
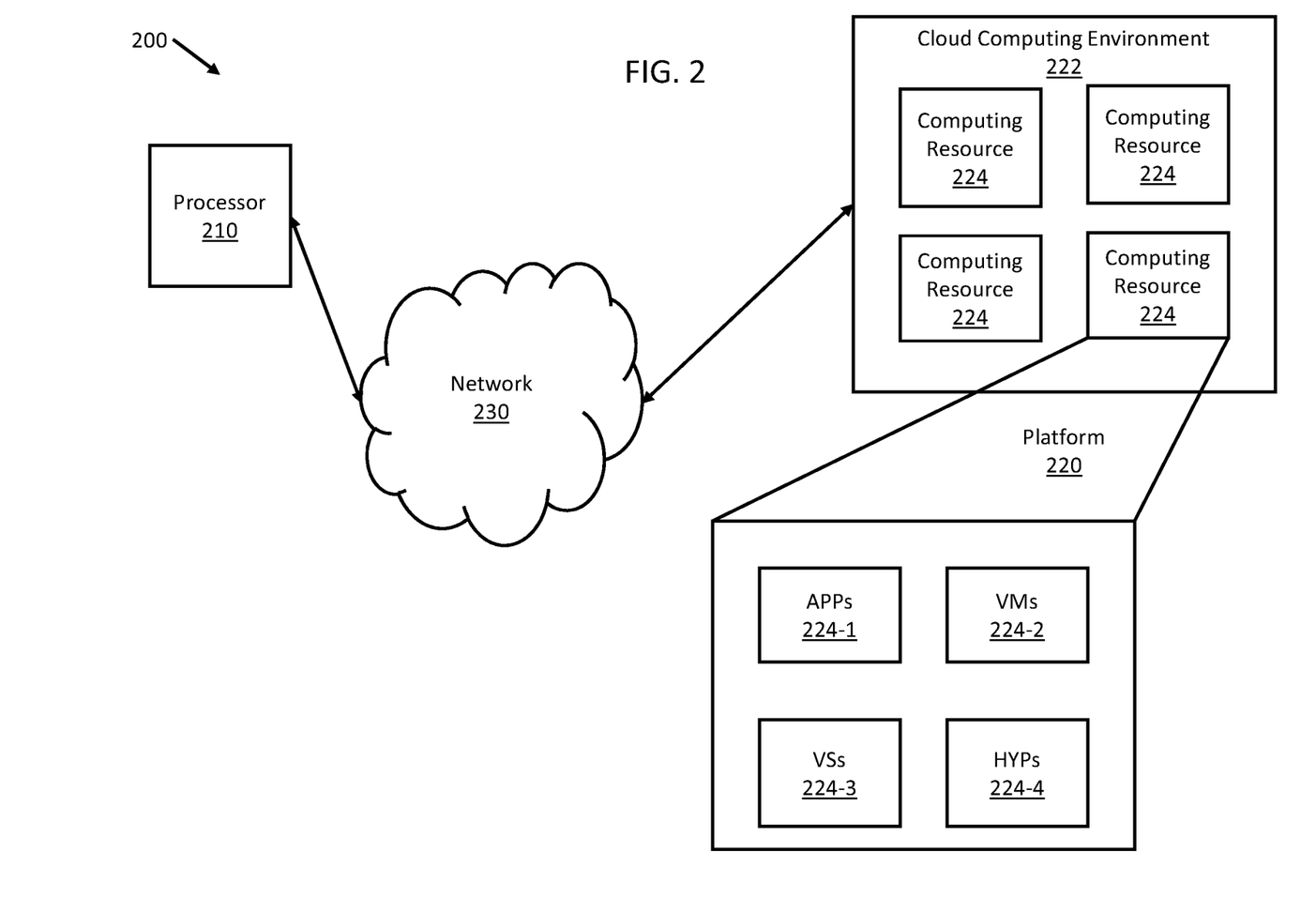
FIG. 2 is an example diagrammatic illustration of a component of the network architecture of FIG. 1, according to embodiments of the present disclosure.

FIG. 2 is a diagram of an example environment 200 in which systems and/or methods, described herein, may be implemented. As shown in FIG. 2, environment 200 may include a device 210, a platform 220, and a network 230. Devices of environment 200 may interconnect via wired connections, wireless connections, or a combination of wired and wireless connections. In embodiments, any of the functions of the elements included in the telecommunication network 100 may be performed by any combination of elements illustrated in FIG. 2.

Device 210 includes one or more devices capable of receiving, generating, storing, processing, and/or providing information associated with platform 220. For example, device 210 may include a network element (gNB DU, gNB CU CP, gNB CU UP, eNodeB, etc.) a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, device 210 may receive information from and/or transmit information to platform 220. In some embodiments device 210 may include network element 101, user equipment, or user device.

Platform 220 includes one or more devices capable of providing network services, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like. Application 224-1 includes one or more software applications that may be provided to or accessed by device 210. Application 224-1 may eliminate a need to install and execute the software applications on device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
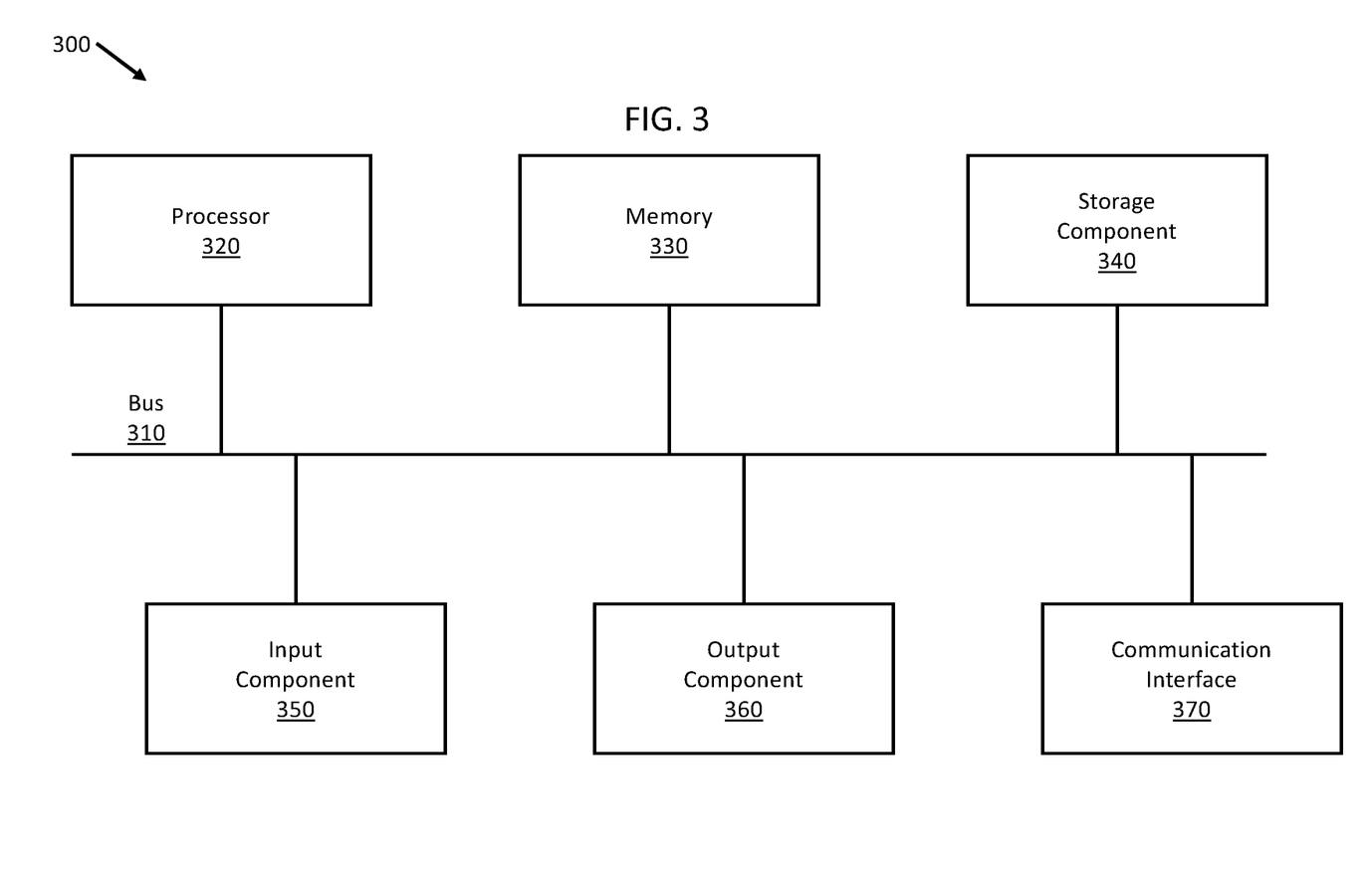
FIG. 3 is an example diagrammatic illustration of a component of the network architecture of FIG. 1, according to embodiments of the present disclosure.

FIG. 3 is a diagram of example components of a device 300. Device 300 may correspond to device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable storage medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the modules or components of FIG. 1 may be implemented by or using any one of the elements illustrated in FIGS. 2-3.

Figure 4:
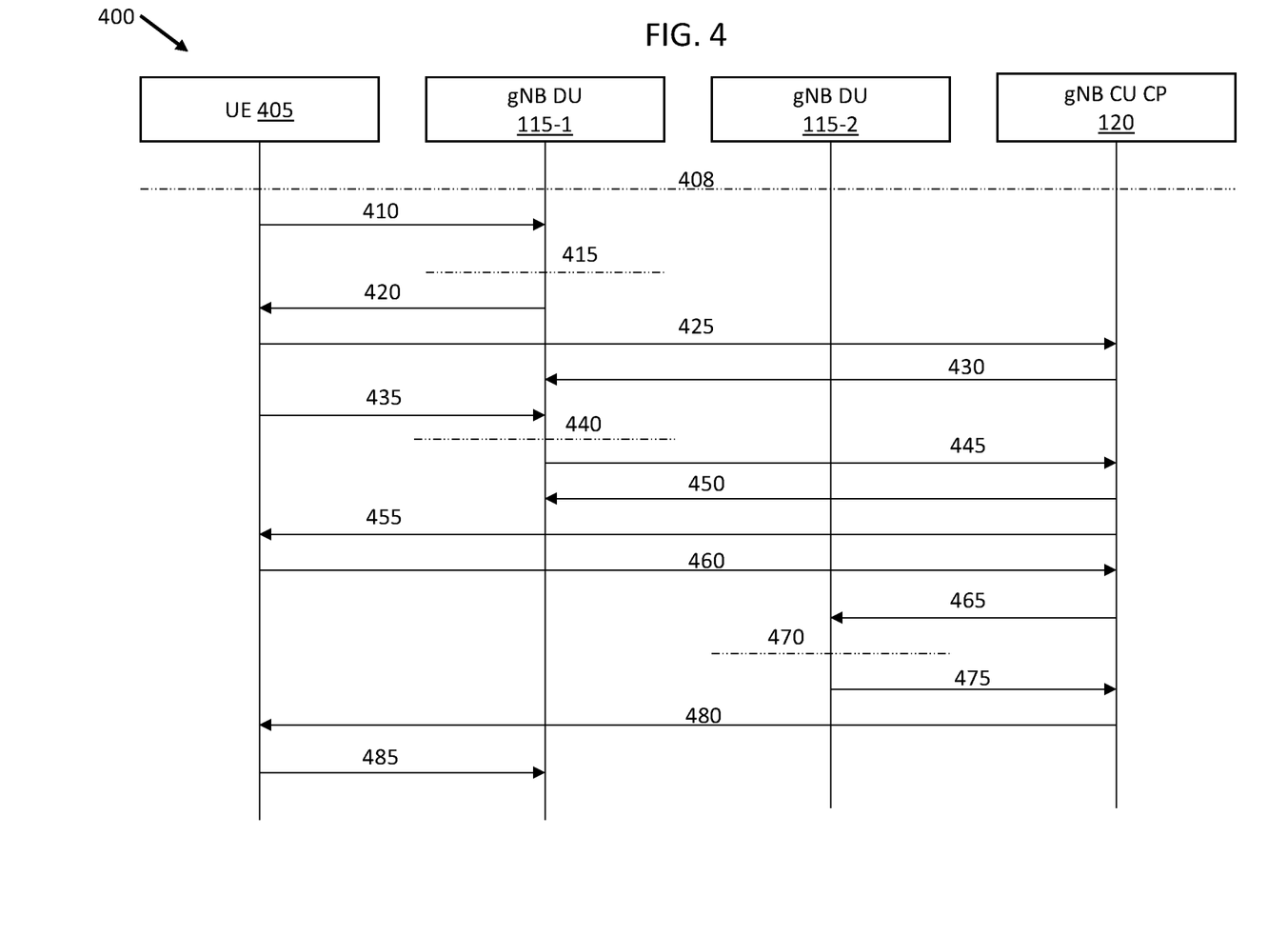
FIG. 4 is an example workflow diagram illustrating an example process optimizing configuration of inter-frequency measurements for LTM of user equipment (UE), according to embodiments of the present disclosure.

FIG. 4 is an example workflow diagram illustrating an example signaling process 400 for optimizing configuration of inter-frequency measurements for LTM of user equipment (UE), according to embodiments of the present disclosure.

As shown in FIG. 4, signaling process 400 may include UE 405, gNB DU 115-1, gNB DU 115-2, and gNB CU CP 120.

At 408, the UE 405 may be configured with LTM with one or more target cells in a gNB DU 115-1 which may also be referred to as serving gNB DU 115-1. At 410, the UE 405 may be send an intra-frequency L1 measurement report to gNB DU 115-1 based on the UE being configured with LTM with one or more target cells in gNB DU 115-1. At 415, a target cell radio condition may be satisfied and a serving cell change may be performed to a target cell within the serving gNB DU 115-1. At 420, the gNB DU 115-1 may transmit a serving cell change command to change the serving cell of UE 405 to the target cell in gNB DU 115-1. Then, at 425, UE 405 may transmit an RRC reconfiguration message to the gNB CU CP 120.

At 430, the gNB CU CP 120 may transmit and the serving gNB DU 115-1 may receive LTM load information associated with neighbor DUs. At 435, UE 405 and other UEs may transmit respective intra-frequency L1 measurement reports to the serving gNB DU 115-1.

At 440, the serving gNB DU 115-1 may determine that there are no ideal or candidate intra-frequency LTM target cells within gNB DU 115-1 because of radio conditions and/or due to the LTM load of neighbor DUs being too high. Based on determining that no candidate target cells are available or that the candidate target cell does not meet handover criteria or a threshold number of candidate target cells are not available, at 445, the gNB DU 115-1 may transmit a UE context modification required message to configure inter-frequency target cells for LTM to gNB CU CP 120. At 450, gNB CU CP may respond with an acknowledgement and confirms the context modification.

At 455, the gNB CU CP 120 may transmit to UE 405 and other UEs RRC reconfiguration messages to configure inter-frequency L3 measurements. In response to the gNB CU CP 120 RRC reconfiguration message, at 460, UE 405 and other UEs may perform measurements and transmit RRC measurement reports.

At 465, the gNB CU CP 120 may transmit to one or more target cells in a second gNB DU 115-2 a UE context setup request, and at 470, prepare the one or more target cells in gNB DU 115-2 for an inter-frequency LTM. Upon setup being configured, at 475, the one or more target cells in gNB DU 115-2 may transmit a response including the target cell configuration to the gNB CU CP 120.

At 480, an RRC configuration message may be transmitted to UE 405 including one or more inter-frequency LTM target cells and their inter-frequency L1 measurement configuration. At 485, UE 405 may perform inter-frequency L1 measurements and transmit an inter-frequency L1 measurement report to the serving gNB DU 115-1, which may lead to the UE being configured to UE 405 being associated with a cell in gNB DU 115-2 as a serving cell.

Figure 5:
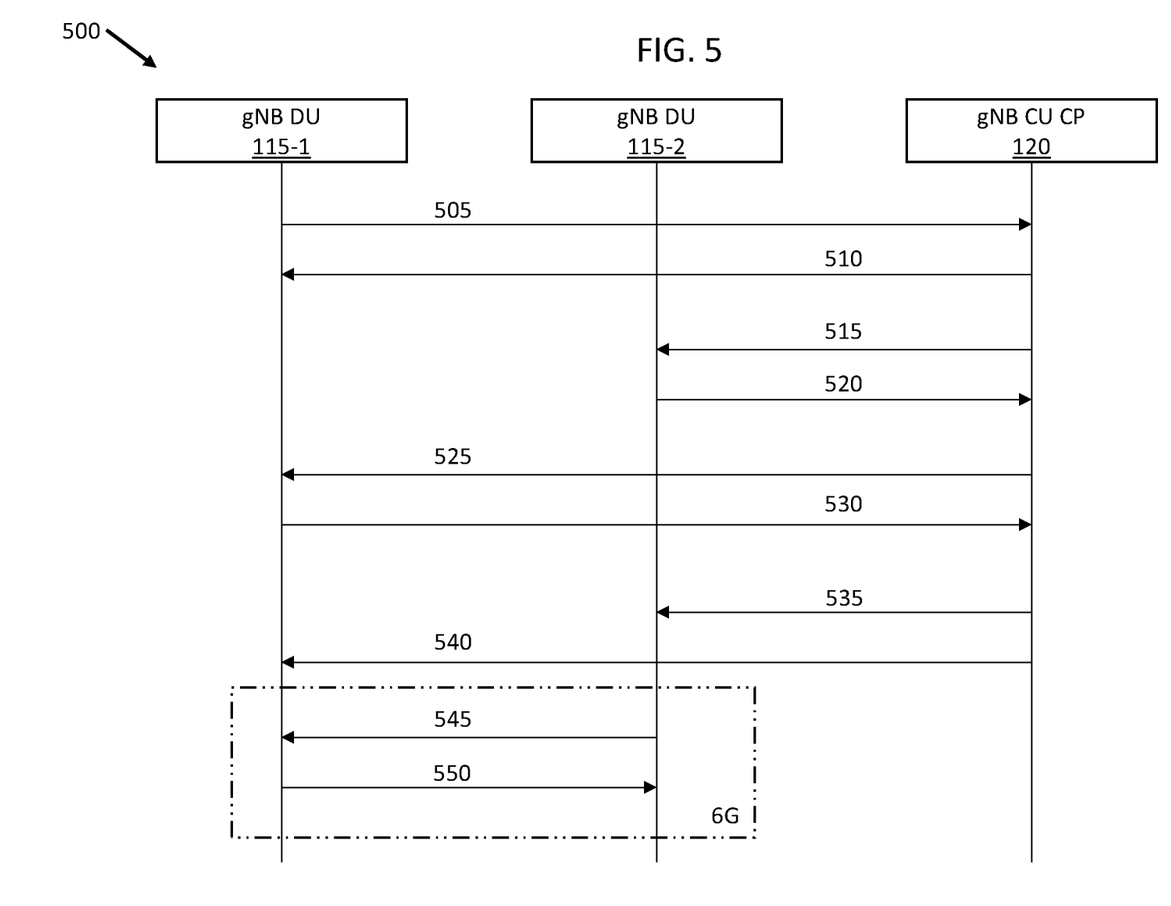
FIG. 5 is an example workflow diagram illustrating an example signaling process for reporting lower level mobility (LTM) loads among neighboring gNodeB distributed units (gNB DU), according to embodiments of the present disclosure.

FIG. 5 is an example workflow diagram illustrating an example signaling process 400 for reporting lower level mobility (LTM) loads among neighboring gNodeB distributed units (gNB DU), according to embodiments of the present disclosure.

As shown in FIG. 5, signaling process 500 may include gNB DU 115-1, gNB DU 115-2, and gNB CU CP 120.

At 505, during F1 interface and/or protocol setup, gNB DU 115-1 may transmit a setup request to gNB CU CP 120 requesting intra-frequency and inter-frequency information for all the cells in gNB DUs neighboring gNB DU 115-1. At 510, gNB CU CP 120 may transmit to gNB DU 115-1 intra-frequency and inter-frequency information for all the cells in gNB DUs neighboring gNB DU 115-1, including e.g., gNB DU 115-2.

At 515, gNB CU CP 120 may request, from gNB DU 115-2, resource status report or load reports associated with the cells in gNB DU 115-2. Based on receiving the request from gNB CU CP 120, gNB DU 115-2 may transmit its LTM load report to gNB CU CP 120. Similarly, at 525-530, the gNB CU CP may request a resource status report or an LTM load report from each of the gNB DUs within gNB 110 (e.g., gNB DU 115-3, etc.).

At 535, gNB DU 115-2 may receive, from gNB CU CP 120, a resource status update or neighbor DUs LTM load reports. Similarly, at 540, gNB DU 115-1 may receive, from gNB CU CP 120, a resource status update or neighbor DUs LTM load reports.

In some embodiments, e.g., 6G networks, there may be a direct DU-DU interface and based on such a gNB DU 115-1 and gNB DU 115-2 interface being present, at 545-550, the gNB DUs may communicate amongst themselves about their respective LTM loads.

Figure 6:
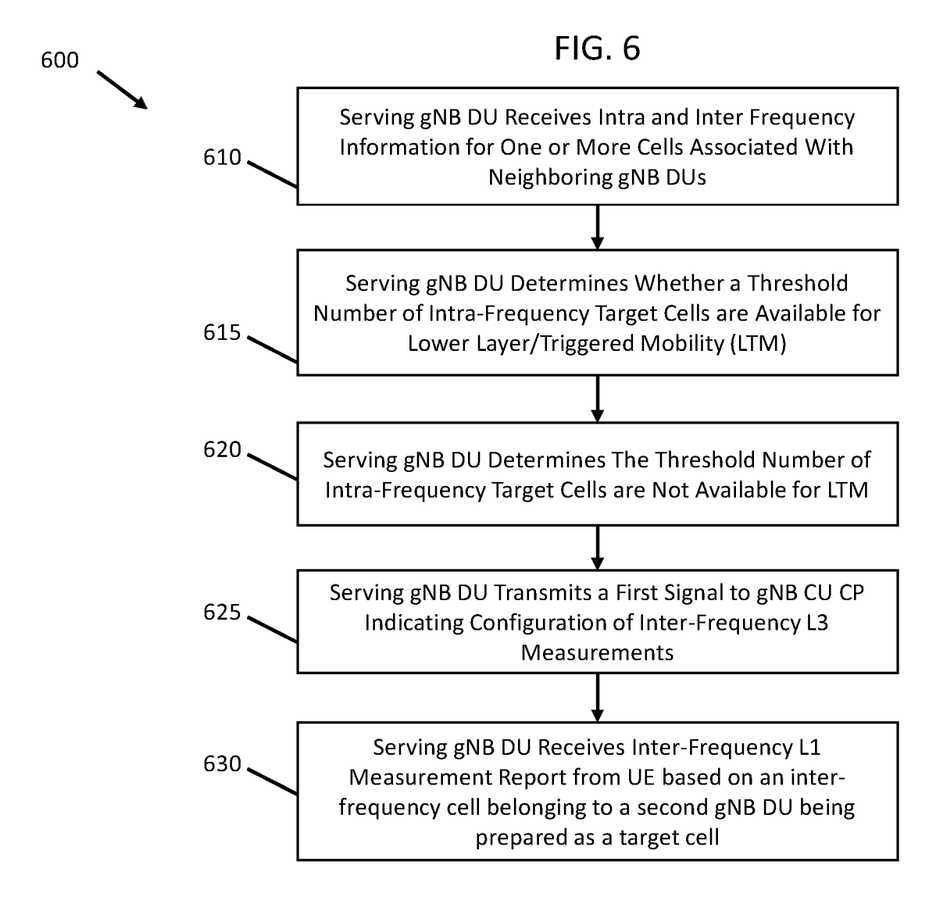
FIG. 6 is an example flowchart illustrating example process optimizing configuration of inter-frequency measurements for LTM of UE, according to embodiments of the present disclosure.

FIG. 6 is an example flowchart illustrating example process 600 optimizing configuration of inter-frequency measurements for LTM of UE, according to embodiments of the present disclosure.

At operation 610, a serving gNB DU may receive intra-frequency information and inter-frequency information for one or more cells associated with one or more neighboring gNB DUs. As an example, gNB DU 115-1 may receive intra-frequency information and inter-frequency information for one or more cells associated with one or more of its neighboring gNB DUs.

The serving gNB DU may determine whether a threshold number of intra-frequency target cells are available for LTM. As an example, serving gNB DU 115-1 may determine whether a threshold number of intra-frequency target cells are available for LTM. The threshold here could have a minimum value of one.

In some embodiments, at operation 615, determining whether the threshold number of intra-frequency target cells for LTM are available may include determining, by the serving gNB DU, whether the threshold number of intra-frequency target cells for LTM are available based on one or more intra-frequency L1 measurement reports associated with respective UEs received by the serving gNB DU and based on cell locations associated with the respective UEs. In some embodiments, the intra-frequency target cells available for LTM may include at least one cell in the serving gNB DU or the one or more neighboring gNB DUs.

In some embodiments, at operation 620, determining whether the threshold number of intra-frequency target cells for LTM are available may include dynamically determining, by the serving gNB DU, whether the threshold number of intra-frequency target cells for LTM are available based on respective LTM loads associated with the one or more cells in the serving gNB DU or the one or more cells associated with the one or more neighboring gNB DUs. In some embodiments, the threshold number of intra-frequency target cells for LTM may be one. In some embodiments, the respective LTM loads may include a percentage availability of a cell for LTM, among the one or more cells in the serving gNB DU or the one or more cells in the one or more neighboring gNB DUs. The respective LTM loads may be received by the serving gNB DU from the gNB CU CP over a DU-CU CP interface periodically. In some embodiments, for example in a 6G network, the respective LTM loads may be received by the serving gNB DU from another gNB DU over a DU-DU interface.

At operation 625, serving gNB DU may transmit a first signal to a gNB CU CP based on determining that the threshold number of intra-frequency target cells for LTM are unavailable. As an example, serving gNB DU 115-1 may transmit a first signal to a gNB CU CP 120. In some embodiments, the intra-frequency target cells available for LTM may include at least one cell in the serving gNB DU or the one or more neighboring gNB DUs. In some embodiments, the threshold number of intra-frequency target cells for LTM may be one. In some embodiments, the first signal may include timing information, and wherein the timing information may indicate to the gNB CU CP a time to configure the inter-frequency L3 measurements associated with the one or more inter-frequency target cells.

At operation 630, the serving gNB DU may receive an inter-frequency L1 measurement report from a UE based on an inter-frequency cell belonging to a second serving gNB DU being prepared as a target cell among the one or more inter-frequency target cells for LTM. As an example, gNB DU 115-2 may receive an inter-frequency L1 measurement report from a UE 405 based on the gNB DU 115-2 being prepared as a target cell among the one or more inter-frequency target cells for LTM.

Although FIGS. 4-6 show example blocks and/or operations of processes 400-600, in some implementations, process 400, process 500, and process 600 may include additional blocks and/or operations, fewer blocks and/or operations, different blocks and/or operations, or differently arranged blocks and/or operations than those depicted in FIGS. 4-6. Additionally, or alternatively, two or more of the blocks of process 400, process 500, and process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method for optimizing configuration of inter-frequency measurements for L1/L2 triggered mobility (LTM) of user equipment (UE), the method being executed by at least one processor, the method including receiving, by a serving gNodeB distributed unit (serving gNB DU), intra-frequency information and inter-frequency information for one or more cells associated with one or more neighboring gNB DUs, wherein the one or more neighboring gNB DUs include DUs expected to interwork with the serving gNB DU for LTM; determining, by the serving gNB DU, whether at least one intra-frequency target cell, above a pre-defined threshold is available for LTM; based on determining that the at least one intra-frequency target cell for LTM is unavailable, transmitting, by the serving gNB DU, a first signal to a gNB centralized unit control plane (CU CP), wherein the first signal indicates to the gNB CU CP to configure a user equipment (UE) with inter-frequency L3 measurements associated with one or more inter-frequency target cells; and receiving, by the serving gNB DU, an inter-frequency L1 measurement report from the UE based on an inter-frequency cell belonging to a second gNB DU being prepared as a target cell among the one or more inter-frequency target cells for LTM.

(2) The method of feature (1), in which determining whether at least one intra-frequency target cell for LTM is available includes determining, by the serving gNB DU, whether the at least one intra-frequency target cells for LTM is available based on one or more intra-frequency L1 measurement reports associated with the UE received by the serving gNB DU and based on cell locations associated with the UE.

(3) The method according to any of the features from (1) to (2), in which the at least one intra-frequency target cells for LTM is available based on one or more intra-frequency L1 measurement reports associated with the UE received by the serving gNB DU and based on cell locations associated with the UE.

(4) The method according to any of the features from (1) to (3), in which determining whether the at least one intra-frequency target cell for LTM is available includes dynamically determining, by the serving gNB DU, whether the at least one intra-frequency target cells is LTM are available based on respective LTM load reports associated with the one or more cells in the serving gNB DU or the one or more cells associated with the one or more neighboring gNB DUs.

(5) The method according to any of the features from (1) to (4), in which the respective LTM load reports include a percentage resource availability of a cell to configure LTM among the one or more cells in the serving gNB DU or the one or more cells in the one or more neighboring gNB DUs.

(6) The method according to any of the features from (1) to (5), in which the respective LTM load reports associated with the one or more cells in the one or more neighboring gNB DUs are received by the serving gNB DU from the gNB CU CP over a DU-CU CP interface.

(7) The method according to any of the features from (1) to (6), in which the respective LTM load reports are received by the serving gNB DU from the gNB CU CP periodically.

(8) The method according to any of the features from (1) to (7), in which the respective LTM load reports are received by the serving gNB DU from the one or more neighboring gNB DUs over a DU-DU interface.

(9) The method according to any of the features from (1) to (8), in which the serving gNB DU receives the intra-frequency information and the inter-frequency information for the one or more cells associated with the one or more neighboring gNB DUs from the gNB CU CP, and wherein the intra-frequency information and the inter-frequency information is received using F1 interface.

(10) An apparatus for optimizing configuration of inter-frequency measurements for L1/L2 centric inter-frequency mobility management (LTM) of user equipment (UE), the apparatus comprising a plurality of gNodeB distributed unit (serving gNB DU) that include at least one memory configured to store program code; and at least one processor configured to access the program code and operate as instructed by the program code, the program code including first receiving code configured to cause the at least one processor of a first serving gNB DU to receive intra-frequency information and inter-frequency information for one or more cells associated with one or more neighboring gNB DUs, wherein the one or more neighboring gNB DUs include DUs expected to interwork with the serving gNB DU for LTM; first determining code configured to cause the at least one processor of the first serving gNB DU to determine whether at least one intra-frequency target cell, above a pre-defined threshold is available for LTM; based on determining that the at least one intra-frequency target cell for LTM is unavailable, transmitting code configured to cause the at least one processor of the first serving gNB DU to transmit a first signal to a gNB centralized unit control plane (CU CP), wherein the first signal indicates to the gNB CU CP to configure a user equipment (UE) with inter-frequency L3 measurements associated with one or more inter-frequency target cells; and second receiving code configured to cause the at least one processor of the first serving gNB DU to receive an inter-frequency L1 measurement report from the UE based on an inter-frequency cell belonging to a second gNB DU being prepared as a target cell among the one or more inter-frequency target cells for LTM.

(11) The apparatus according to the features from (10), in which the first determining code includes second determining code configured to cause the at least one processor of the first serving gNB DU to determine whether the at least one intra-frequency target cell for LTM is available based on one or more intra-frequency L1 measurement reports associated with the UE received by the first serving gNB DU and based on cell locations associated with the UE.

(12) The apparatus according to the features from (10) to (11), in which the intra-frequency target cells available for LTM comprise at least one cell in the first serving gNB DU or the one or more neighboring gNB DUs.

(13) The apparatus according to the features from (10)-(12), in which the first determining code includes third determining code configured to cause the at least one processor of the first serving gNB DU to dynamically determine whether the at least one intra-frequency target cell for LTM is available based on respective LTM load reports associated with the one or more cells in the first serving gNB DU or the one or more cells associated with the one or more neighboring gNB DUs.

(14) The apparatus according to the features from (10)-(13), in which the respective LTM load reports include a percentage resource availability of a cell to configure LTM among the one or more cells in the serving gNB DU or the one or more cells in the one or more neighboring gNB DUs.

(15) A non-transitory computer-readable medium storing instructions, the instructions comprising: one or more instructions that, when executed by one or more processors of a plurality of gNodeB distributed unit (serving gNB DU) for optimizing configuration of inter-frequency measurements for L1/L2 centric inter-frequency mobility management (LTM) of user equipment (UE), cause the one or more processors to receive, at a first serving gNB DU, intra-frequency information and inter-frequency information for one or more cells associated with one or more neighboring gNB DUs, wherein the one or more neighboring gNB DUs include DUs expected to interwork with the first serving gNB DU for LTM; determine, by the first serving gNB DU, whether at least one intra-frequency target cell, above a pre-defined threshold is available for LTM; based on determining that the at least one intra-frequency target cell for LTM is unavailable, transmit, by the first serving gNB DU, a first signal to a gNB centralized unit control plane (CU CP), wherein the first signal indicates to the gNB CU CP to configure a user equipment (UE) with inter-frequency L3 measurements associated with one or more inter-frequency target cells; and receive, by the first serving gNB DU, an inter-frequency L1 measurement report from the UE based on an inter-frequency cell belonging to a second gNB DU being prepared as a target cell among the one or more inter-frequency target cells for LTM.

(16) The non-transitory computer-readable medium according to the features from (15), in which determining whether the at least one intra-frequency target cell for LTM is available includes determining, by the first serving gNB DU, whether the at least one intra-frequency target cells for LTM is available based on one or more intra-frequency L1 measurement reports associated with the UE received by the serving gNB DU and based on cell locations associated with the UE.

(17) The non-transitory computer-readable medium according to the features from (15)-(16), in which the intra-frequency target cells available for LTM comprise at least one cell in the serving gNB DU or the one or more neighboring gNB DUs.

(18) The non-transitory computer-readable medium according to the features from (15)-(17), in which determining whether the at least one intra-frequency target cell for LTM is available includes dynamically determining, by the serving gNB DU, whether the at least one intra-frequency target cells is LTM are available based on respective LTM load reports associated with the one or more cells in the serving gNB DU or the one or more cells associated with the one or more neighboring gNB DUs.

(19) The non-transitory computer-readable medium according to the features from (15)-(18), in which the respective LTM load reports include a percentage resource availability of a cell to configure LTM among the one or more cells in the serving gNB DU or the one or more cells in the one or more neighboring gNB DUs.

(20) The non-transitory computer-readable medium according to the features from (15)-(19), in which the respective LTM load reports associated with the one or more cells in the one or more neighboring gNB-DUs are received by the serving gNB DU from the gNB CU CP over a DU-CU CP interface.

(21) The method according to the features from (1)-(9), in which the gNB CU CP transmits, to one or more DUs associated with the gNB CU CP, a resource status request, wherein the one or more DUs associated with the gNB CU CP includes the serving DU and the one or more neighboring gNB DUs of the serving DU; and the gNB CU CP receives, from the one or more DUs associated with the gNB CU CP, resource status responses, wherein the resources status responses may include periodic or event based LTM load status reports.

(22) The method according to the features from (1)-(9) and (21), in which a gNB CU CP transmits, to each of the one or more DUs associated with the gNB CU CP, the resources status responses, of the neighboring gNB DUs, including respective LTM load status reports.

(23) The method according to the features from (1)-(9) and (21)-(22), in which a target and/or a serving gNB DU receives, from the gNB CU CP, the resources status responses including respective LTM load status reports of the one or more DUs associated with the gNB CU CP, which are neighboring gNB DUs to the said target or serving gNB DU.

(24) The apparatus according to the features from (10)-(14), in which in which the gNB CU CP transmits, to one or more DUs associated with the gNB CU CP, a resource status request, wherein the one or more DUs associated with the gNB CU CP includes the serving DU and the one or more neighboring gNB DUs; and the gNB CU CP receives, from the one or more DUs associated with the gNB CU CP, resource status responses, wherein the resources status responses may include periodic or event based LTM load status reports.

(25) The apparatus according to the features from (10)-(14) and (24), in which a gNB CU CP transmits, to each of the one or more DUs associated with the gNB CU CP, the resources status responses of the neighboring gNB DUs, including respective LTM load status reports.

(26) The apparatus according to the features from (10)-(14) and (24)-(25), in which a target gNB DU receives, from the gNB CU CP, the resources status responses including respective LTM load status reports of the one or more DUs associated with the gNB CU CP.

(27) The non-transitory computer-readable medium according to the features from (15)-(20), in which in which the gNB CU CP transmits, to one or more DUs associated with the gNB CU CP, a resource status request, wherein the one or more DUs associated with the gNB CU CP includes the serving DU and the one or more neighboring gNB DUs; and the gNB CU CP receives, from the one or more DUs associated with the gNB CU CP, resource status responses, wherein the resources status responses may include LTM load status reports.

(28) The non-transitory computer-readable medium according to the features from (15)-(20) and (27), in which a gNB CU CP transmits, to each of the one or more DUs associated with the gNB CU CP, the resources status responses including respective LTM load status reports.

(29) The non-transitory computer-readable medium according to the features from (15)-(20) and (26)-(27), in which a target gNB DU receives, from the gNB CU CP, the resources status responses including respective LTM load status reports of the one or more DUs associated with the gNB CU CP.

What is claimed is:

1. A method for optimizing configuration of inter-frequency measurements for L1/L2 triggered mobility (LTM) of user equipment (UE), the method being executed by at least one processor, the method comprising:
   receiving, by a serving gNodeB distributed unit (serving gNB DU), intra-frequency information and inter-frequency information for one or more cells associated with one or more neighboring gNB DUs, wherein the one or more neighboring gNB DUs include DUs expected to interwork with the serving gNB DU for LTM;
   determining, by the serving gNB DU, whether at least one intra-frequency target cell, above a pre-defined threshold is available for LTM;
   based on determining that the at least one intra-frequency target cell for LTM is unavailable, transmitting, by the serving gNB DU, a first signal to a gNB centralized unit control plane (CU CP), wherein the first signal indicates to the gNB CU CP to configure a user equipment (UE) with inter-frequency L3 measurements associated with one or more inter-frequency target cells; and
   receiving, by the serving gNB DU, an inter-frequency L1 measurement report from the UE based on an inter-frequency cell belonging to a second gNB DU being prepared as a target cell among the one or more inter-frequency target cells for LTM.

2. The method of claim 1, wherein determining whether at least one intra-frequency target cell for LTM is available comprises:
   determining, by the serving gNB DU, whether the at least one intra-frequency target cells for LTM is available based on one or more intra-frequency L1 measurement reports associated with the UE received by the serving gNB DU and based on cell locations associated with the UE.

3. The method of claim 2, wherein the intra-frequency target cells available for LTM comprise at least one cell in the serving gNB DU or the one or more neighboring gNB DUs.

4. The method of claim 1, wherein determining whether the at least one intra-frequency target cell for LTM is available comprises:
   dynamically determining, by the serving gNB DU, whether the at least one intra-frequency target cells is LTM are available based on respective LTM load reports associated with the one or more cells in the serving gNB DU or the one or more cells associated with the one or more neighboring gNB DUs.

5. The method of claim 4, wherein the respective LTM load reports include a percentage resource availability of a cell to configure LTM among the one or more cells in the serving gNB DU or the one or more cells in the one or more neighboring gNB DUs.

6. The method of claim 5, wherein the respective LTM load reports associated with the one or more cells in the one or more neighboring gNB DUs are received by the serving gNB DU from the gNB CU CP over a DU-CU CP interface.

7. The method of claim 6, wherein the respective LTM load reports are received by the serving gNB DU from the gNB CU CP periodically.

8. The method of claim 4, wherein the respective LTM load reports are received by the serving gNB DU from the one or more neighboring gNB DUs over a DU-DU interface.

9. The method of claim 1, wherein the serving gNB DU receives the intra-frequency information and the inter-frequency information for the one or more cells associated with the one or more neighboring gNB DUs from the gNB CU CP, and wherein the intra-frequency information and the inter-frequency information is received using F1 interface.

10. An apparatus for optimizing configuration of inter-frequency measurements for L1/L2 centric inter-frequency mobility management (LTM) of user equipment (UE), the apparatus comprising a plurality of gNodeB distributed unit (serving gNB DU) that include:
- at least one memory configured to store program code; and
- at least one processor configured to access the program code and operate as instructed by the program code, the program code comprising:
    - first receiving code configured to cause the at least one processor of a first serving gNB DU to receive intra-frequency information and inter-frequency information for one or more cells associated with one or more neighboring gNB DUs, wherein the one or more neighboring gNB DUs include DUs expected to interwork with the serving gNB DU for LTM;
    - first determining code configured to cause the at least one processor of the first serving gNB DU to determine whether at least one intra-frequency target cell, above a pre-defined threshold is available for LTM;
    - based on determining that the at least one intra-frequency target cell for LTM is unavailable, transmitting code configured to cause the at least one processor of the first serving gNB DU to transmit a first signal to a gNB centralized unit control plane (CU CP), wherein the first signal indicates to the gNB CU CP to configure a user equipment (UE) with inter-frequency L3 measurements associated with one or more inter-frequency target cells; and
    - second receiving code configured to cause the at least one processor of the first serving gNB DU to receive an inter-frequency L1 measurement report from the UE based on an inter-frequency cell belonging to a second gNB DU being prepared as a target cell among the one or more inter-frequency target cells for LTM.

11. The apparatus of claim 10, wherein the first determining code comprises:
- second determining code configured to cause the at least one processor of the first serving gNB DU to determine whether the at least one intra-frequency target cell for LTM is available based on one or more intra-frequency L1 measurement reports associated with the UE received by the first serving gNB DU and based on cell locations associated with the UE.

12. The apparatus of claim 11, wherein the intra-frequency target cells available for LTM comprise at least one cell in the first serving gNB DU or the one or more neighboring gNB DUs.

13. The apparatus of claim 10, wherein the first determining code comprises:
- third determining code configured to cause the at least one processor of the first serving gNB DU to dynamically determine whether the at least one intra-frequency target cell for LTM is available based on respective LTM load reports associated with the one or more cells in the first serving gNB DU or the one or more cells associated with the one or more neighboring gNB DUs.

14. The apparatus of claim 13, wherein the respective LTM load reports include a percentage resource availability of a cell to configure LTM among the one or more cells in the serving gNB DU or the one or more cells in the one or more neighboring gNB DUs.

15. A non-transitory computer-readable medium storing instructions, the instructions comprising: one or more instructions that, when executed by one or more processors of a plurality of gNodeB distributed unit (serving gNB DU) for optimizing configuration of inter-frequency measurements for L1/L2 centric inter-frequency mobility management (LTM) of user equipment (UE), cause the one or more processors to:
- receive, at a first serving gNB DU, intra-frequency information and inter-frequency information for one or more cells associated with one or more neighboring gNB DUs, wherein the one or more neighboring gNB DUs include DUs expected to interwork with the first serving gNB DU for LTM;
- determine, by the first serving gNB DU, whether at least one intra-frequency target cell, above a pre-defined threshold is available for LTM;
- based on determining that the at least one intra-frequency target cell for LTM is unavailable, transmit, by the first serving gNB DU, a first signal to a gNB centralized unit control plane (CU CP), wherein the first signal indicates to the gNB CU CP to configure a user equipment (UE) with inter-frequency L3 measurements associated with one or more inter-frequency target cells; and
- receive, by the first serving gNB DU, an inter-frequency L1 measurement report from the UE based on an inter-frequency cell belonging to a second gNB DU being prepared as a target cell among the one or more inter-frequency target cells for LTM.

16. The non-transitory computer-readable medium of claim 15, wherein determining whether the at least one intra-frequency target cell for LTM is available comprises:
- determining, by the first serving gNB DU, whether the at least one intra-frequency target cells for LTM is available based on one or more intra-frequency L1 measurement reports associated with the UE received by the serving gNB DU and based on cell locations associated with the UE.

17. The non-transitory computer-readable medium of claim 16, wherein the intra-frequency target cells available for LTM comprise at least one cell in the serving gNB DU or the one or more neighboring gNB DUs.

18. The non-transitory computer-readable medium of claim 15, wherein determining whether the at least one intra-frequency target cell for LTM is available comprises:
- dynamically determining, by the serving gNB DU, whether the at least one intra-frequency target cells is LTM are available based on respective LTM load reports associated with the one or more cells in the serving gNB DU or the one or more cells associated with the one or more neighboring gNB DUs.

19. The non-transitory computer-readable medium of claim 18, wherein the respective LTM load reports include a percentage resource availability of a cell to configure LTM among the one or more cells in the serving gNB DU or the one or more cells in the one or more neighboring gNB DUs.

20. The non-transitory computer-readable medium of claim 19, wherein the respective LTM load reports associated with the one or more cells in the one or more neighboring gNB-DUs are received by the serving gNB DU from the gNB CU CP over a DU-CU CP interface.

* * * * *